Figure 1:
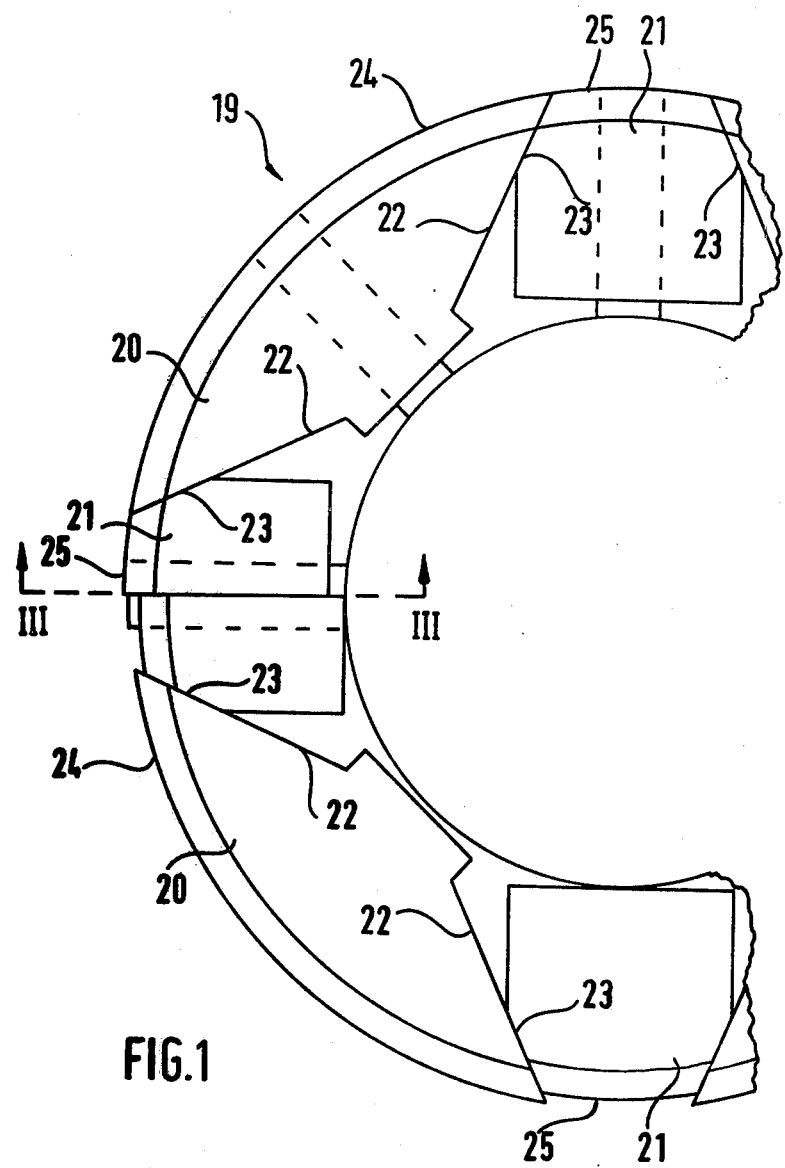

United States Patent [19]

Allitt

[11] 4,154,790
[45] May 15, 1979

[54] PNEUMATIC TIRE MANUFACTURE

[75] Inventor: Bernard C. Allitt, Sutton Coldfield, England

[73] Assignee: Dunlop Limited, England

[21] Appl. No.: 833,134

[22] Filed: Sep. 14, 1977

Related U.S. Application Data

[62] Division of Ser. No. 725,577, Sep. 22, 1977, Pat. No. 4,060,357.

[30] Foreign Application Priority Data

Oct. 2, 1975 [GB] United Kingdom .............. 40284/75

[51] Int. Cl.² ............................................ B29H 5/02
[52] U.S. Cl. .................................... 264/315; 264/326
[58] Field of Search .................. 425/38, 47, 58, 36; 264/36, 315, 94, 326

[56] References Cited

U.S. PATENT DOCUMENTS

| | | | |
|---|---|---|---|
| 2,904,832 | 9/1959 | Fröhlich et al. | 425/36 X |
| 2,939,175 | 6/1960 | Fröhlich et al. | 425/36 X |

*Primary Examiner*—Jan H. Silbaugh
*Attorney, Agent, or Firm*—Stevens, Davis, Miller & Mosher

[57] ABSTRACT

A method of moulding a tire in a mould in which the retaining rings for the bead formation of a green tire are variable in diameter to allow for increase in the bead diameter of the finished tire relative to its green state and to prevent damage caused by forcing the beads of a green tire over bead rings of too large diameter. Preferably the bead retaining rings expand to their maximum diameter in response to the application of curing pressure inside the tire and automatically retract when curing pressure is relieved.

4 Claims, 5 Drawing Figures

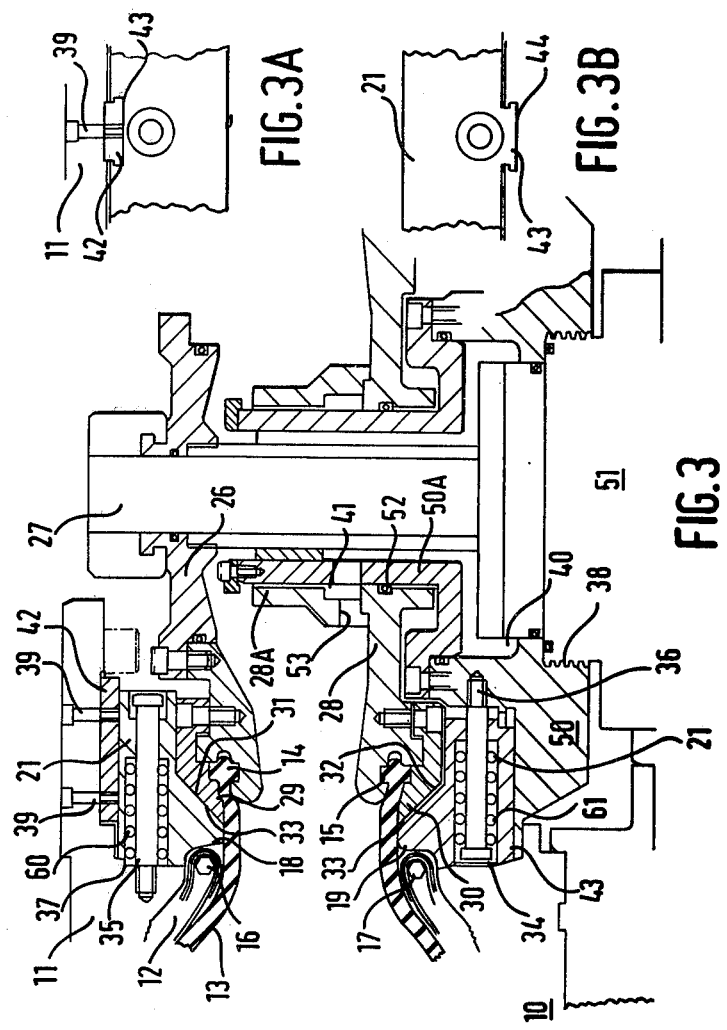

PNEUMATIC TIRE MANUFACTURE

This is a division of application Ser. No. 725,577 filed 22 Sept. 1977, now Pat. No. 4,060,357.

The present invention relates to improvements in pneumatic tire manufacture and more particularly to an improved tire bead retaining ring for the mould of a tire forming press.

In the manufacture of pneumatic tires it is usual to surround the bead reinforcement with a surplus of uncured rubber such that the bead diameter in the green tire (by which is meant the uncured tire carcass) is slightly smaller than the bead diameter of the finished tire. The mould of the tire forming press utilizing an inflatable diaphragm to shape the tire includes a fixed lower part and an upper part which moves vertically relative to the lower part as the press is closed or opened. Each part of the mould includes a bead ring in the form of an annular flange projecting towards the other part of the mould and each of these rings seats a respective one of the beads of the tire during the moulding process.

Hitherto each bead retaining ring has been of fixed dimensions, the diameter of the ring being equal to the diameter of the bead of the finished tire. It will thus be seen that when the tire is in the green state its beads are of slightly smaller diameter than the bead retaining rings of the mould and have to be force fitted thereover during mould closure. There is a danger that in so doing the rubber of the tire at the bead and the ply cords or wires which extend tangentially from opposite sides of the bead reinforcement radially through the tire walls may be displaced relative to the bead reinforcement or core. This in turn may cause localized alteration of the shape of the tire in cross-section so that even though the beads may remain circular the tread may become non-circular under inflation pressure. There is also a danger that by being improperly located prior to being forced over the associated ring a bead will be deformed and in the finished tire the cured rubber layer covering the bead reinforcement will be unequally distributed around the bead with the result that the bead will be unsymmetrical. It is a primary object of the present invention to provide a method whereby the above causes of defective finished tires may be eliminated.

According to the present invention there is provided a method of manufacturing a pneumatic tire by means of a mould having a bead ring of variable dimensions, the method comprising reducing the dimensions of said ring, locating a bead of a green tire over the ring and subsequently expanding the ring to a predetermined, relatively enlarged diameter corresponding with the diameter of the bead of the finished tire. The expansion of the ring is preferably simultaneous with the application of curing pressure to the tire in the closed mould and the ring is preferably retracted as curing pressure is relieved.

To practice the method of the present invention there is provided a mould for the manufacture of a pneumatic tire having a bead diameter which, in the green state of the tire, is slightly smaller than that of the finished tire, the mould having a support ring for a bead of the tire which ring is variable in dimensions between a fully expanded condition in which the outer periphery of the ring is substantially uninterrupted and is of diameter substantially equal to the diameter of the bead of the finished tire and a retracted condition in which the dimensions of the ring are reduced sufficiently to permit the unobstructed mounting thereover of the bead of the green tire.

The ring is preferably biased to its retracted condition by biasing means arranged to be overcome by curing pressure in operation of the mould whereby the ring adopts its expanded condition automatically upon application of curing pressure within the mould and automatically resumes its retracted condition when curing pressure is relieved.

The ring may be in the form of segments having radially inwardly tapering rear surfaces slidably engaged by radially outwardly tapering wedge elements interposed between adjacent pairs of segments, the segments and wedge elements all having arcuates radially outer surfaces which lie on a common circle when the ring is fully expanded, radially inward movement of the wedge elements permitting a closer grouping of the segments as they move radially inwardly to reduce the area of the ring in its retracted condition.

Preferred embodiments of the device to practice the method of the invention will now be described with reference to the accompanying drawings, in which:-

Figure 2:
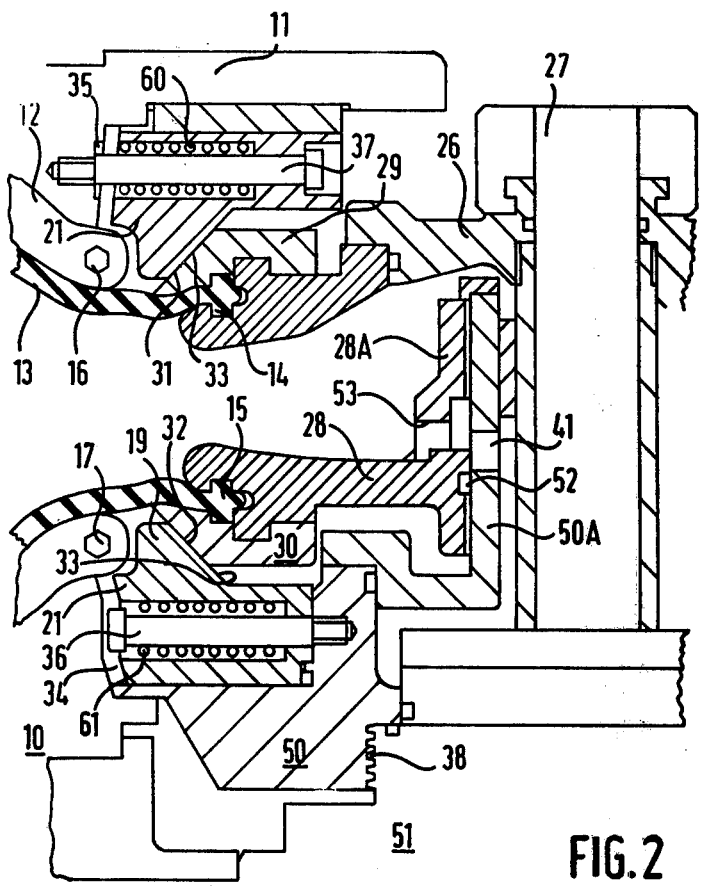

FIG. 1 is a plan view of a retractable bead retaining ring in accordance with the present invention, FIGS. 2 and 3 are radial sectional elevations of a tire forming mould having bead retaining rings in accordance with the invention, each being taken on the line A—A of FIG. 1 and showing the ring of FIG. 1 respectively in the retracted and the expanded condition, and FIGS. 3A and 3B are detail views taken on the lines A—A and B—B, respectively, of FIG. 3.

Referring first to FIGS. 2 and 3, the tire forming mould illustrated comprises, as is well known per se, a lower part 10 and an upper part 11 which is displaced vertically relative to the lower part 10 as the tire forming press, in which the mould is incorporated is opened and closed. Prior to the closure of the mould a green tire, or tire carcass 12 of uncured rubber is located between the parts 10 and 11 of the mould and as the part 11 of the mould is brought down towards the part 10 a diaphragm 13 is expanded within the toroidal carcass 12 by inflation. Opposite axial ends 14 and 15 of the diaphragm 13 are clamped between elements 26, 29 and 28 respectively movable with the mould parts 10 and 11. Prior to closure of the mould part 11 relative to the mould part 10 air pressure within the diaphragm 13 is increased (shaping pressure) so that following closure of the mould the outer surface of the green tire 12 is brought into close contact with the mould parts 10 and 11 and with a tread forming pattern (not shown) positioned against the radially outer periphery of the green tire 12. Thereafter, with the mould closed, pressure within the diaphragm 13 is greatly increased (moulding pressure) and water at high temperature is caused to flow within the diaphragm 13 to cause the rubber of the green tire 12 to cure. After sufficient time has elapsed with the mould closed for the green tire 12 to be fully cured moulding pressure within the diaphragm 13 is relieved and the mould part 11 is raised relative to the part 10. The diaphragm 13 is subsequently withdrawn from the interior of the finished tire as the upper clamping elements 26, 29 are raised on a piston 27. The tire is now removed from the press. The tire forming operation thus far described is conventional and no more detailed explanation is considered necessary since the process has been in use for many years and is familiar to those skilled in the art.

As is also well known per se the bead formations 16 and 17 of the green tire 12 are located in the mould to surround and seat on respective bead support rings 18 and 19 respectively of the upper and lower parts of the mould. However, in accordance with the present invention these bead support rings 18 and 19 are not fixed. Annular flanges extend from one mould part towards the other, but each is made up of a plurality of elements 20 and 21 (Fig. 1) each capable of limited radial movement with respect to the associated part 10 or 11 of the mould. The bead retaining rings 18 and 19 of the two mould parts are of similar construction and each comprises a plurality of segments 20 having radially inwardly tapering rear surfaces 22. These are in sliding engagement with radially outwardly tapering surfaces 23 of wedge elements 21 each interposed between an adjacent pair of the segments 20. All of the elements 20 and 21 of each bead support ring 18 and 19 have arcuate radially outer surfaces 24 and 25 which, in the fully expanded condition of the ring 18 or 19, lie on a common circle which is of diameter substantially equal to the predetermined bead diameter of the finished tire.

Each of the segments 20 and wedge elements 21 making up each bead support ring 18 and 19 is guided by a key and key-way for radial movement so that radially inward movement of the wedge elements 21 permits radially inward movement of the segments 20 resulting in a closer grouping of the elements of each bead support ring such that its total area is reduced. The key 42 fixed by bolts 39 to the upper press part 11 is shown in cross-section in FIG. 3A, this running in a keyway 43 extending radially of an upper mould part wedge element 21. Keys such as 43 are fixed to the undersides of the segments 20 and wedge elements 21 of the lower mould part 10A and run in radial keyways such as 44 in the lower mould part 10A.

As is conventional, the upper axial end 14 of the diaphragm 13 is supported by a member 26 with a piston 27 of the press so as to be vertically displaceable. In accordance with the present invention, the lower axial end 15 of the diaphragm 13 is supported by an element 28 which slidably surrounds the piston 27 and is vertically displaceable. Secured to the element 26 is a clamping plate 29 which anchors the end 14 of the diaphragm to the element 26. A similar clamping plate 30 is associated with the element 28 to grip the other end 15 of the diaphragm 30 and in accordance with the present invention the clamping plates 29 and 30 have radially outwardly tapering radially outer peripheral surfaces 31 and 32 which slidably engage cam surfaces 33 of the wedge elements 21 which taper axially inwardly of the mould. Co-operation of the cam surfaces 31, 32 and 33 ensures that as the diaphragm support elements 26 and 28 are moved apart from the position of FIG. 2 to the position of FIG. 3 the wedge elements 21 are displaced radially outwardly of the mould, causing radially outward displacement of the segments 20 until the radially outer surfaces of all of the wedge elements and segments lie on a common circle (FIG. 3) whereupon further radially outward movement of the wedge elements 21 and segments 20 is prevented by their abutment with fixed frusto-conical surfaces 34 and 35 of the mould. Such radially outward displacement of the components 20 and 21 of the bead rings 18 and 19 is resisted by strong compression springs 60, 61 located in respective, radially extending bores in the components 20 and 21.

Bolts such as 36 and 37 have their ends screw threaded into the mould parts 10A and 11 and the aforesaid compression springs 60, 61 surround the respective bolts and are held in compression either between the head of the bolt and a recess in the wedge element 21 (spring 61, lower part of FIG. 2 or 3) or between the associated mould part and the end of a blind bore in the wedge element 21 (spring 60, upper part of FIG. 2 or 3). The settings of the compression springs 60, 61 are strong enough to ensure that they will not yield to the relatively light air pressure applied to the interior of the diaphragm 13 when the mould is first closed (FIG. 2) but such that when pressure within the diaphragm is subsequently increased during curing of the tire 12 the springs 60, 61 will yield to allow the ring components 20 and 21 to move radially outwardly to the fully expanded position shown in FIG. 3 under the cam action applied to them by the clamping plates 29 and 30 of the diaphragm 13 as the diaphragm supports 26 and 28 move apart under the influence of moulding pressure. When moulding pressure is subsequently relieved the ring components 21 and 20 are moved back to the retracted position shown in FIG. 2 by the springs 60, 61 thereby displacing the diaphragm supports 26 and 28 towards one another to the position shown in FIG. 2. The lower bead ring 19 and associated diaphragm support element 28 are assembled with a component 50 as a lower mould-part sub-assembly screw threaded onto the lower press part 51 at 38. Upstanding from the lower diaphragm support element 28 is a tubular projection 28A which surrounds a tubular extension 50A of the component 50. The projection 28A is slidable on the extension 50A and a pressure seal is provided at 52 to prevent loss of pressure from the diaphragm between the projection 28A and extension 50A. Water at high temperature for curing a tire in the closed mould is introduced at 40 and flows upwardly between the piston 27 and extension 50A to discharge into the interior of the diaphragm 13 through ports 41 and 53 in the extension 50A and projection 28A. The outflow path for the water is on the diametrically opposite side of the column 27A.

Having now described my invention what I claim is:

1. In a method of manufacturing a pneumatic tire in a mould by opening the mould, placing at least one of the beads of a green tire over a bead support ring upon which the bead seats, closing the mould, forcing the green tire into close contact with the mould and heating the green tire to cure it, the improvement comprising reducing initially the diameter of said at least one bead support ring by application of a biasing force so as to facilitate tire bead placement thereover, locating said bead over the ring, expanding the ring to a predetermined relatively enlarged diameter corresponding with the finished diameter for the bead by overcoming the biasing force with curing pressure within the tire.

2. The method of claim 1 including inflating a diaphram within the green tire to apply said curing pressure, the diaphram being secured to means which cam against movable portions of said ring.

3. A method as claimed in claim 1, wherein the expansion of the ring is simultaneous with the application of curing pressure to the tire in the closed mould.

4. A method as claim in claim 3 wherein the ring is retracted as curing pressure is relieved.

* * * * *